US012594610B2

(12) United States Patent
Lee

(10) Patent No.: US 12,594,610 B2
(45) Date of Patent: Apr. 7, 2026

(54) FOUR-HOLE CORE DRILLING MACHINE

(71) Applicant: EGUN CO., LTD., Gwangju-si (KR)

(72) Inventor: Chae Mun Lee, Seongnam-si (KR)

(73) Assignee: EGUN CO., LTD., Gwangju-si (KR)

( * ) Notice: Subject to any disclaimer, the term of this patent is extended or adjusted under 35 U.S.C. 154(b) by 351 days.

(21) Appl. No.: 17/994,643

(22) Filed: Nov. 28, 2022

(65) Prior Publication Data

US 2023/0167700 A1     Jun. 1, 2023

(30) Foreign Application Priority Data

Nov. 29, 2021     (KR) ........................ 10-2021-0167075

(51) Int. Cl.
    B23B 39/16        (2006.01)
    B23B 51/04        (2006.01)
(52) U.S. Cl.
    CPC ............ B23B 39/167 (2013.01); B23B 51/04 (2013.01)
(58) Field of Classification Search
    CPC ..... B23B 39/167; B23B 51/04; Y10T 408/38; Y10T 408/67
    See application file for complete search history.

(56) References Cited

U.S. PATENT DOCUMENTS

| | | | | |
|---|---|---|---|---|
| 2,731,050 A | * | 1/1956 | Nunn ..................... | B23B 39/167 408/46 |
| 3,089,356 A | * | 5/1963 | Westra ..................... | B26F 1/16 408/46 |
| 3,134,276 A | * | 5/1964 | Abrams .................. | B23Q 16/06 173/214 |
| 3,635,570 A | * | 1/1972 | DeGelleke ............... | B23Q 3/06 408/43 |
| 4,061,437 A | * | 12/1977 | Strange ..................... | B27F 5/12 408/127 |
| 5,085,543 A | * | 2/1992 | Click ..................... | B23Q 39/04 408/51 |
| 7,704,020 B1 | | 4/2010 | Stengel | |
| 10,239,129 B2 | * | 3/2019 | Kosugi ................. | B23B 39/168 |

(Continued)

FOREIGN PATENT DOCUMENTS

| | | | | | |
|---|---|---|---|---|---|
| AT | 377221 B | * | 2/1985 | ............... | B27C 9/04 |
| CN | 108543975 A | * | 9/2018 | ........... | B23B 39/167 |
| CN | 109967771 A | * | 7/2019 | ............. | B23B 47/26 |

(Continued)

*Primary Examiner* — Eric A. Gates

(74) *Attorney, Agent, or Firm* — Fish IP Law, LLP; Tomas A. Prieto

(57)        ABSTRACT

A four-hole core drilling machine of the invention includes a vertically reciprocating carriage mounted to a body, a motor coupled to the carriage, a fixing plate coupled to the carriage, to rotatably support a drive shaft of the motor, a pivoting plate fastened to the fixing plate under the condition that a pivot angle of the pivoting plate is changed, a drive pulley coupled to the drive shaft, to be rotatable by the drive shaft, four driven pulleys rotatably mounted to the pivoting plate near corners of the pivoting plate, four driven shafts rotatably mounted to the pivoting plate and coupled to the four driven pulleys, to be rotatable by the driven pulleys, a belt mounted around the drive pulley and the driven pulleys, to transmit rotation force of the drive pulley to the driven pulleys, and four core bits coupled to lower ends of the driven shafts.

7 Claims, 3 Drawing Sheets

(56)  References Cited

U.S. PATENT DOCUMENTS

| | | | | |
|---|---|---|---|---|
| 2024/0286205 A1* | 8/2024 | Lee | ........................ | B23B 47/30 |
| 2025/0073953 A1* | 3/2025 | Lee | ........................ | B28D 1/041 |

FOREIGN PATENT DOCUMENTS

| | | | | | |
|---|---|---|---|---|---|
| DE | 127670 | C | | 1/1901 | |
| DE | 2205285 | A1 * | 10/1972 | |
| DE | 2507662 | A1 | 9/1976 | |
| DE | 2551528 | A1 * | 5/1977 | |
| DE | 2646826 | A1 * | 4/1978 | |
| DE | 202005020120 | U1 * | 2/2006 | .......... B23B 39/167 |
| FR | 971477 | A * | 1/1951 | |
| FR | 2707538 | A1 | 1/1995 | |
| JP | 6029607 | U | 2/1985 | |
| JP | H01321159 | A | 12/1989 | |
| JP | 2001105211 | A | 4/2001 | |
| JP | 2005179243 | | 1/2006 | |
| JP | 2017104913 | A | 6/2017 | |
| KR | 200306111 | Y1 | 3/2003 | |
| KR | 100602162 | B1 | 8/2006 | |
| KR | 1020100056074 | | 5/2010 | |
| KR | 101302141 | | 8/2013 | |
| KR | 101613313 | B1 | 4/2016 | |
| NL | 9301721 | A | 5/1995 | |
| WO | 9216326 | | 10/1992 | |
| WO | WO-2019056886 | A1 * | 3/2019 | .......... B23B 39/167 |

* cited by examiner

FOUR-HOLE CORE DRILLING MACHINE

This application claims the benefit of Korean Patent Application No. 10-2021-0167075, filed on Nov. 29, 2021, which is hereby incorporated by reference as if fully set forth herein.

BACKGROUND OF THE INVENTION

Field of the Invention

The present invention relates to a four-hole core drilling machine, and more particularly to a four-hole core drilling machine capable of simultaneously drilling four holes by simultaneously rotating four core bits.

Description of the Prior Art

A core drilling machine is a mechanical apparatus for drilling a hole into a wall, a ceiling, etc. upon piping construction in a building. Generally, such a core drilling machine constitutes a core drill assembly together with various devices configured to manipulate a core drill.

A general core drill assembly, which is currently used, includes a base fixed to a structure, into which a hole is to be drilled, by an anchor bolt, a stand disposed to be perpendicular to the base and formed with a rack at one side surface thereof, a driving body with a pinion mounted therein, the driving body being vertically reciprocable along the stand in accordance with a rotating operation of a handle, and a core drill mounted to the driving body and configured to drill a hole into a particular portion of the structure. Here, the core drill is constituted by a core bit configured to drill a hole into the structure through frictional contact between the core bit and the structure, and a drive motor configured to rotate the core bit at a high speed.

The core drill assembly having the above-mentioned configuration operates as follows. When the handle installed at the driving body is rotated in a state in which the base is fixed to a wall or a bottom surface of the structure using a plurality of anchor bolts, the pinion of the driving body, which engages with the rack of the stand, moves along the rack. As a result, the driving body reciprocates vertically along the stand. In this state, when electric power is applied to the drive motor, the core bit is rotated. The core bit, which rotates at a high speed, drills a hole into the structure while moving forwards.

However, such a conventional core drilling machine performs drilling using only one core bit mounted thereto. For this reason, for drilling of a plurality of holes, the core drilling machine should be moved to hole positions one by one, and tasks for fixing the core drilling machine using anchor bolts and drilling a hole should be performed for the hole positions one by one. As a result, there are problems in that work is troublesome, and a lot of time is taken.

SUMMARY OF THE INVENTION

Therefore, the present invention has been made in view of the above problems, and it is an object of the present invention to provide a four-hole core drilling machine capable of not only simultaneously drilling four holes by simultaneously rotating four core bits, but also simultaneously drilling four holes arranged to be spaced apart from one another by various distances.

In accordance with an aspect of the present invention, the above and other objects can be accomplished by the provision of a four-hole core drilling machine including a body, a vertically reciprocating carriage vertically reciprocably mounted to the body, a motor coupled to one side surface of the carriage, a fixing plate coupled to one side of a lower portion of the carriage, to rotatably support a drive shaft of the motor, a pivoting plate fastened to the fixing plate under a condition that a pivot angle of the pivoting plate is changed, a drive pulley coupled to the drive shaft, to be rotatable by the drive shaft, four driven pulleys rotatably mounted to the pivoting plate near corners of the pivoting plate, respectively, four driven shafts rotatably mounted to the pivoting plate while extending through the pivoting plate, the four driven shafts being coupled to the four driven pulleys, to be rotatable by the driven pulleys, respectively, a belt mounted around the drive pulley and the four driven pulleys, to transmit rotation force of the drive pulley to the four driven pulleys, and four core bits coupled to lower ends of the four driven shafts, respectively.

The body may include a base fixed to a structure to be drilled, and a stand vertically coupled to the base and formed with a gear at one side surface thereof. The carriage may be provided with a pinion engaged with the gear, and may be vertically reciprocably mounted to the stand.

The fixing plate may include a plurality of fastening holes arranged on a circumference having a predetermined radius from the drive shaft. The pivoting plate may include a plurality of fastening holes extending vertically through the pivoting plate. The pivoting plate may be fixed at a predetermined pivot position with respect to the fixing plate by fasteners fastened through the plurality of fastening holes of the fixing plate and the plurality of fastening holes of the pivoting plate.

The pivoting plate may further include a tension pulley fixed under a condition that a shaft thereof is moved toward the belt such that the tension pulley applies tension to the belt.

The pivoting plate may further include a pair of fixed pulleys rotatably mounted to the pivoting plate around the belt, to support an outer surface of the belt.

Water supply hoses may be connected to upper portions of the four driven shafts, respectively, to supply cooling water. The gear may include a rack.

In accordance with another aspect of the present invention, there is provided a four-hole core drilling machine including a base fixed to a structure to be drilled, a stand vertically coupled to the base and formed with a rack at one side surface thereof, a vertically reciprocating carriage vertically reciprocably mounted to the body and provided with a pinion engaged with the rack, a motor coupled to one side surface of the carriage, a fixing plate coupled to one side of a lower portion of the carriage, to rotatably support a drive shaft of the motor, a pivoting plate fastened to the fixing plate under a condition that a pivot angle of the pivoting plate is changed, a drive sprocket coupled to the drive shaft, to be rotatable by the drive shaft, four driven sprockets rotatably mounted to the pivoting plate near corners of the pivoting plate, respectively, four driven shafts rotatably mounted to the pivoting plate while extending through the pivoting plate, the four driven shafts being coupled to the four driven sprockets, to be rotatable by the driven sprockets, respectively, a chain mounted around the drive sprocket and the four driven sprockets, to transmit rotation force of the drive sprocket to the four driven sprockets, and four core bits coupled to lower ends of the four driven shafts, respectively.

The fixing plate may include a plurality of fastening holes arranged on a circumference having a predetermined radius from the drive shaft. The pivoting plate may include a plurality of fastening holes extending vertically through the pivoting plate. The pivoting plate may be fixed at a predetermined pivot position with respect to the fixing plate by fasteners fastened through the plurality of fastening holes of the fixing plate and the plurality of fastening holes of the pivoting plate.

The pivoting plate may further include a tension sprocket fixed under a condition that a shaft thereof is moved toward the chain such that the tension sprocket applies tension to the chain.

The pivoting plate may further include a pair of fixed sprockets rotatably mounted to the pivoting plate around the chain, to support an outer surface of the chain.

Water supply hoses may be connected to upper portions of the four driven shafts, respectively, to supply cooling water.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
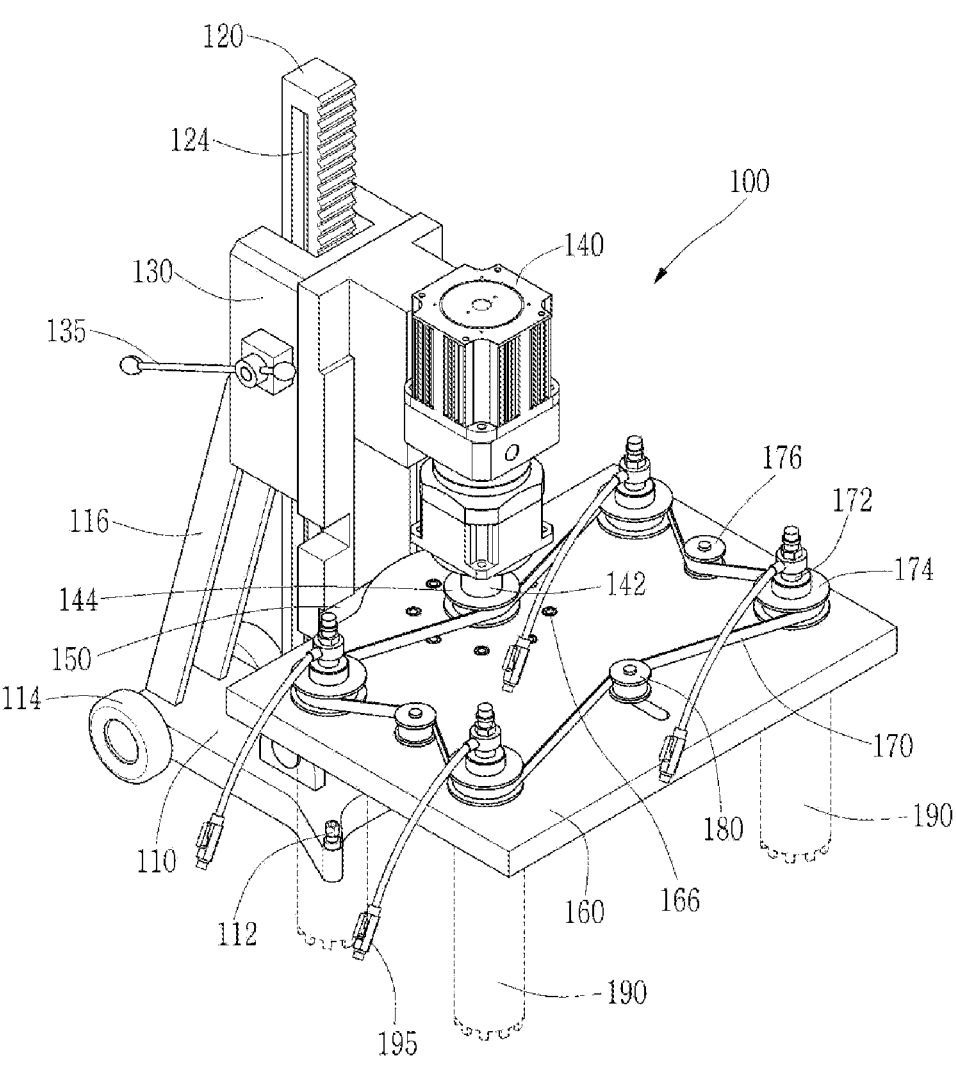
FIG. 1 is a perspective view schematically showing a four-hole core drilling machine according to an exemplary embodiment of the present invention.

Embodiments may be variously varied and may have various forms. In connection with this, specific embodiments will be illustrated in the drawings, and will be described in detail in the specification, but embodiments should not be construed as limited to the specific embodiments. It is to be appreciated that all changes, equivalents, and substitutes that do not depart from the spirit and technical scope of the embodiments are encompassed in the embodiments.

It should be noted that the terms used herein are merely used to describe a specific embodiment, not to limit the present invention. Incidentally, unless clearly used otherwise, singular expressions include a plural meaning. In this application, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Hereinafter, embodiments of the present disclosure will be described in detail with reference to the accompanying drawings. It is noted that the same reference numerals in the drawings designate the same constituent elements, respectively. When the detailed description of the relevant known function or configuration is determined to unnecessarily obscure the gist of the present invention, the detailed description will be omitted. For similar reasons, in the accompanying drawings, a part of constituent elements is exaggerated, omitted, or schematically illustrated.

Figure 2:
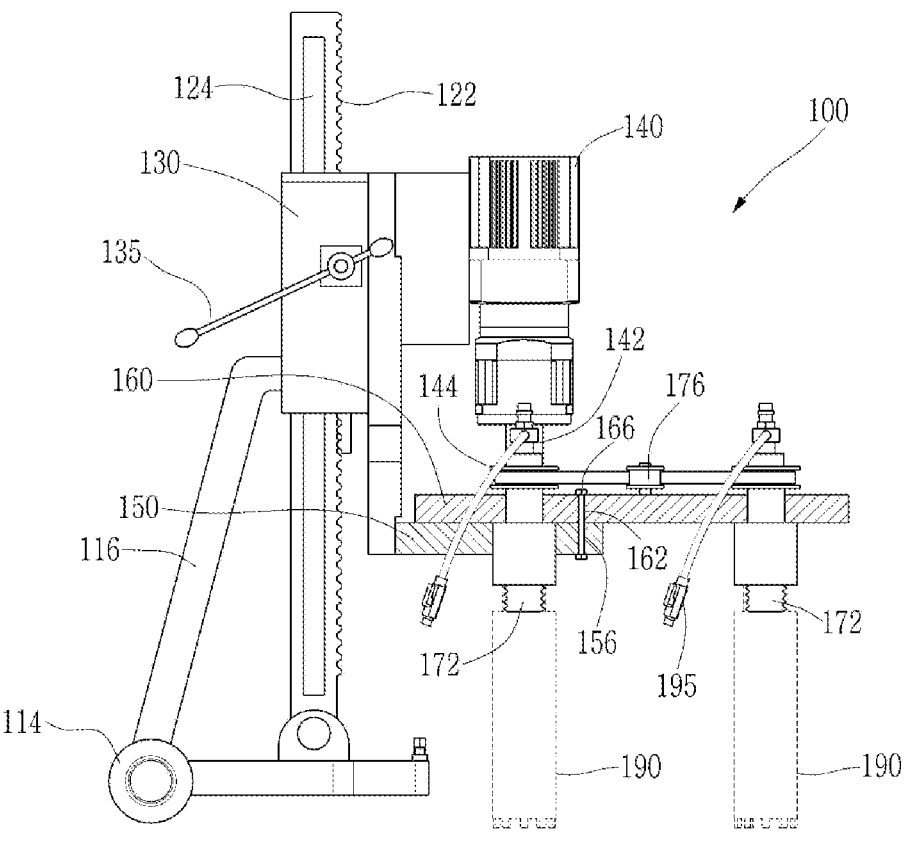
FIG. 2 is a front view schematically showing the four-hole core drilling machine according to the exemplary embodiment of the present invention.
Figure 3:
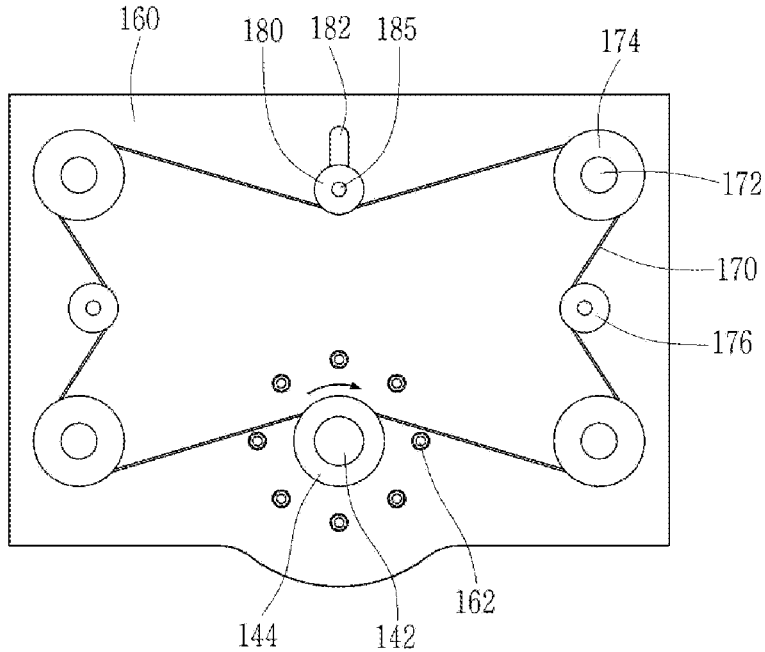
FIG. 3 is a top view showing pulleys and a belt mounted to a pivoting plate in the four-hole core drilling machine according to the exemplary embodiment of the present invention.

FIG. 1 is a perspective view schematically showing a four-hole core drilling machine according to an exemplary embodiment of the present invention. FIG. 2 is a front view schematically showing the four-hole core drilling machine according to the exemplary embodiment of the present invention. FIG. 3 is a top view showing pulleys and a belt mounted to a pivoting plate in the four-hole core drilling machine according to the exemplary embodiment of the present invention.

The four-hole core drilling machine according to the exemplary embodiment of the present invention, which is designated by reference numeral "100", includes a base 110 fixed to a structure to be drilled, a stand 120 vertically coupled to the base 110 and formed with a rack 122 at one side surface thereof, a vertically reciprocating carriage 130 provided with a pinion engaged with the rack 122 and vertically reciprocably mounted to the stand 120, a motor 140 coupled to one side surface of the carriage 130, a fixing plate 150 coupled to one side of a lower portion of the carriage 130, to rotatably support a drive shaft 142 of the motor 140, and a pivoting plate 160 fastened to the fixing plate 150 under the condition that a pivot angle of the pivoting plate 160 is changed. The four-hole core drilling machine 100 also includes a drive pulley 144 coupled to the drive shaft 142, to be rotatable by the drive shaft 142, four driven pulleys 174 rotatably mounted to the pivoting plate 160 near corners of the pivoting plate 160, respectively, four driven shafts 172 rotatably mounted to the pivoting plate 160 while extending through the pivoting plate 160, the four driven shafts 172 being coupled to the four driven pulleys 174, to be rotatable by the driven pulleys 174, respectively, a belt 170 mounted around the drive pulley 144 and the four driven pulleys 174, to transmit rotation force of the drive pulley 144 to the four driven pulleys 172, and four core bits 190 coupled to lower ends of the four driven shafts 172, respectively. Among the constituent elements of the four-hole core drilling machine 100 according to the exemplary embodiment of the present invention, the base 110 and the stand 120 may be collectively referred to as a "body".

The four-hole core drilling machine 100 is a core drilling machine configured to simultaneously drill four holes into a horizontal bottom, a wall, or an inclined or curved surface having various shapes in a concrete structure.

The base 110 is provided with at least one pair of anchor bolts 112 therein and, as such, may be fixed to a surface of a structure. In addition, the base 110 is provided with at least one pair of wheels 114 and, as such, the entirety of the drilling machine 100 may be easily movable.

The stand 120 is vertically coupled to the base 110. The stand 120 may be formed to have a rectangular column shape. A connecting frame 116 is coupled between a middle portion of the stand 120 and the base 110, to support the stand 120 with respect to the base 110. The rack 122 is formed at one side surface of the stand 120, to vertically reciprocate the carriage 130 mounted to the stand 120.

The carriage 130 is provided therein with the pinion (not shown) engaged with the rack 122 and, as such, may be vertically reciprocably mounted to the stand 120. The carriage 130 is provided with a lever 135 configured to rotate the pinion. Accordingly, upon operating the drilling machine 100, the operator may rotate the lever 135, thereby vertically reciprocating the carriage 130. In addition, guide grooves 124 are formed at opposite side surfaces of the stand 120, respectively, to guide and support vertical reciprocation of the carriage 130.

The motor 140 may be coupled to an upper portion of one side surface of the carriage 130, and the fixing plate 150 may be coupled to a lower portion of the side surface of the carriage 130. The motor 140 may be an electric motor, and the drive shaft 142 thereof may be rotatably supported by a bearing (not shown) mounted to the fixing plate 150.

The pivoting plate 160 may be mounted to an upper surface of the fixing plate 150 such that the pivoting plate 160 is pivotable about the drive shaft 142. The pivoting plate 160 may be fixed to the fixing plate 150 by fasteners 166 under the condition that a pivot angle of the pivot plate 160 is changed.

The fixing plate 150 may be formed to take the form of a rectangular plate having an arc shape at one side thereof. Linear sides of the fixing plate 150 may be coupled to the carriage 130 and, as such, the fixing plate 150 may be vertically reciprocable together with the carriage 130. The fixing plate 150 may be provided with a plurality of fastening holes 156 arranged on a circumference having a predetermined radius from the drive shaft 142.

The pivoting plate 160 may be provided with a plurality of fastening holes 162 extending vertically through the pivoting plate 160. The plurality of fastening holes 162 of the pivoting plate 160 may be formed at positions corresponding to the plurality of fastening holes 156 of the fixing plate 150, respectively. As shown in FIG. 2, the pivoting plate 160 may be fixed to the fixing plate 150 at a predetermined angle position by fastening fasteners 168, which are constituted by bolts and nuts, through the fastening holes 156 of the fixing plate 150 and the fastening holes 162 of the pivoting plate 160.

The pivoting plate 160 may be formed to take the form of a substantially-rectangular plate in which a central portion of one side surface thereof extends toward the stand 120 while being rounded. When the pivoting plate 160 is formed to have a simply rectangular plate shape, the pivoting plate 160 may interfere with one side of the carriage 130 or the fixing plate 150 when the pivot position of the pivoting plate 160 is varied. To this end, a round extension is formed at one side of the pivoting plate 160 near the plurality of fastening holes 162, thereby preventing the pivoting plate 160 from interfering with other constituent elements at sides thereof disposed at opposite sides of the extension when the pivoting plate 160 pivots through a predetermined angle.

The drive pulley 144 is coupled to the drive shaft 142 at an upper surface of the pivoting plate 160, to be rotatable by the drive shaft 142. The drive pulley 144 may rotate together with the drive shaft 142 by the motor 140.

The four driven pulleys 174 are mounted to the driven shafts 172 mounted through the pivoting plate 160 near four corners of the pivoting plate 160, to be rotatable together with the driven shafts 172, respectively. Each driven pulley 174 is formed to have a size similar to that of each drive pulley 144. Similarly to each drive pulley 144, each driven pulley 174 is formed with a groove at an outer circumferential surface thereof, in order to prevent the belt 170 from being separated therefrom.

The belt 170 is mounted around the drive pulley 144 and the four driven pulleys 174 and, as such, may transmit rotation force of the drive pulley 144 to the four driven pulleys 172. Thus, the motor 140 may simultaneously rotate the four driven pulleys 174 through the belt 170.

The four driven pulleys 174 are disposed at four corner positions of a rectangle. Alternatively, the four driven pulleys 174 may be disposed at four corner positions of a square such that the four driven pulleys 174 are arranged to be spaced apart from one another by the same distance. In the latter case, holes drilled by the four core bits 190 may be formed to be spaced apart from one another by the same distance.

As described above, the fixing plate 150 may be provided with the plurality of fastening holes 156 arranged on a circumference having a predetermined radius from the drive shaft 142, and the pivoting plate 160 may be provided with the plurality of fastening holes 162 extending vertically through the pivoting plate 160. The pivoting plate 160 may be fixed to the fixing plate 150 in a state in which a pivot angle of the pivoting plate 160 is adjusted from a predetermined pivot position with respect to the fixing plate 150, by fastening the fasteners 168, which are constituted by bolts and nuts, through the fastening holes 156 of the fixing plate 150 and the fastening holes 162 of the pivoting plate 160.

A tension pulley 180 may be mounted to the pivoting plate 160. The tension pulley 180 may be fixed under the condition that a shaft 185 thereof is moved toward the belt 170 such that the tension pulley 180 applies tension to the belt 170. The tension pulley 180 may be mounted at a side opposite to the drive pulley 144. A slot 182 may be formed to extend through the pivoting plate 160 between the two driven shafts 172 disposed at the side opposite to the drive pulley 144. The shaft 185 of the tension pulley 180 may extend through the slot 182, and may be mounted to the slot 182 by a fastener after being adjusted in position in the slot 182. Then, the tension pulley 180 may maintain the belt 170 to be tense while rotating about the fixed shaft 185.

The pivoting plate 160 may be further provided with a pair of fixed pulleys 176 rotatably mounted to the pivoting plate 160 around the belt 170, to support an outer surface of the belt 170. Referring to FIG. 3, one pair of fixed pulleys 176 may be rotatably mounted between the left two driven pulleys 174 and between the right two driven pulleys 174, respectively. The pair of fixed pulleys 176 may increase an angle, at which the belt 170 contacts the driven pulleys 174, together with the tension pulley 180 and, as such, may not only enable rotating force to be surely transmitted through the belt 170, but also may assist in tension maintenance of the belt 170.

Meanwhile, as shown in FIGS. 1 and 2, the core bits 190 are coupled to the lower ends of the driven shafts 172, respectively. The core bits 190 may drill holes while rotating together with the driven pulleys 174 and the driven shafts 172.

Water supply hoses 195 are connected to upper portions of the four driven shafts 172, respectively, to supply cooling water. That is, the drilling machine 100 according to the exemplary embodiment of the present invention may be a wet core drilling machine configured to drill holes by rotating core bits while supplying water. Each driven shaft 172 may extend above an upper surface of the corresponding driven pulley 174, and the corresponding water supply hose 195 may be connected to a side surface of an upper end of the driven shaft 172. Although the four water supply hoses 195 are shown as being independently connected, one supply pipe may be branched to be connected to the four water supply hoses 195.

A four-hole core drilling machine 100 according to another exemplary embodiment of the present invention includes a base 110 fixed to a structure to be drilled, a stand 120 vertically coupled to the base 110 and formed with a rack 122 at one side surface thereof, a vertically reciprocating carriage 130 provided with a pinion engaged with the rack 122 and vertically reciprocably mounted to the stand 120, a motor 140 coupled to one side surface of the carriage 130, a fixing plate 150 coupled to one side of a lower portion of the carriage 130, to rotatably support a drive shaft 142 of the motor 140, and a pivoting plate 160 fastened to the fixing plate 150 under the condition that a pivot angle of the pivoting plate 160 is changed. The four-hole core drilling machine 100 also includes a drive sprocket 144 coupled to the drive shaft 142, to be rotatable by the drive shaft 142, four driven sprockets 174 rotatably mounted to the pivoting plate 160 near corners of the pivoting plate 160, respectively, four driven shafts 172 rotatably mounted to the pivoting plate 160 while extending through the pivoting plate 160, the four driven shafts 172 being coupled to the four driven sprockets 174, to be rotatable by the four driven sprockets 174, respectively, a chain 170 mounted around the drive sprocket 144 and the four driven sprockets 174, to transmit rotation force of the drive sprocket 144 to the four driven sprockets 172, and four core bits 190 coupled to lower ends of the four driven shafts 172, respectively.

Among the constituent elements of the four-hole core drilling machine 100 according to the other exemplary embodiment of the present invention, the base 110 and the stand 120 may also be collectively referred to as a "body".

That is, this embodiment of the present invention is different from the previous embodiment of the present invention in that the belt is substituted by the chain, and the pulleys are substituted by the sprockets.

In detail, since the belt 170 is substituted by the chain 170, the drive pulley 144 is also substituted by the drive sprocket 144, and the four driven pulleys 174 are substituted by the four driven sprockets 174.

In addition, the tension pulley 180 is substituted by a tension sprocket 180, and the pair of fixed pulleys 176 is substituted by a pair of fixed sprockets 176.

Since rotation force of the drive shaft 142 is transmitted through the chain and the sprockets, it may be possible to reliably transmit the rotation force without slip, as compared to the belt and pulleys.

Other configurations of this embodiment are identical to those of the previous embodiment and, as such, no repeated description thereof is given.

As apparent from the above description, in accordance with the four-hole core drilling machine of each exemplary embodiment of the present invention, it may be possible to simultaneously drill four holes by simultaneously rotating the four core bits.

In addition, the pivoting plate is replaced with another pivoting plate in which four core bits are arranged to have a spacing different from that of the former pivoting plate. In this regard, it may be possible to simultaneously drill four holes arranged to have various spacings.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A four-hole core drilling machine comprising:
a body;

a vertically reciprocating carriage vertically reciprocably mounted to the body;
a motor coupled to one side surface of the carriage;
a fixing plate coupled to one side of a lower portion of the carriage, to rotatably support a drive shaft of the motor,
a pivoting plate fastened to the fixing plate under a condition that a pivot angle of the pivoting plate is changed;
a drive sprocket coupled to the drive shaft, to be rotatable by the drive shaft;
four driven sprockets rotatably mounted to the pivoting plate near corners of the pivoting plate, respectively;
four driven shafts rotatably mounted to the pivoting plate while extending through the pivoting plate, the four driven shafts being coupled to the four driven sprockets, to be rotatable by the driven sprockets, respectively;
a chain mounted around the drive sprocket and the four driven sprockets, to transmit rotation force of the drive sprocket to the four driven sprockets; and
four core bits coupled to lower ends of the four driven shafts, respectively.

2. The four-hole core drilling machine according to claim 1, wherein:
the fixing plate comprises a plurality of fastening holes arranged on a circumference having a predetermined radius from the drive shaft;
the pivoting plate comprises a plurality of fastening holes extending vertically through the pivoting plate; and
the pivoting plate is fixed at a predetermined pivot position with respect to the fixing plate by fasteners fastened through the plurality of fastening holes of the fixing plate and the plurality of fastening holes of the pivoting plate.

3. The four-hole core drilling machine according to claim 1, wherein the pivoting plate further comprises a tension sprocket fixed under a condition that a shaft thereof is moved toward the chain such that the tension sprocket applies tension to the chain.

4. The four-hole core drilling machine according to claim 1, wherein the pivoting plate further comprises a pair of fixed sprockets rotatably mounted to the pivoting plate around the chain, to support an outer surface of the chain.

5. The four-hole core drilling machine according to claim 1, wherein water supply hoses are connected to upper portions of the four driven shafts, respectively, to supply cooling water.

6. The four-hole core drilling machine according to claim 1, wherein:
the body comprises:
a base fixed to a structure to be drilled; and
a stand vertically coupled to the base and formed with a gear at one side surface thereof; and
the carriage is provided with a pinion engaged with the gear, and is vertically reciprocably mounted to the stand.

7. The four-hole core drilling machine according to claim 6, wherein the gear comprises a rack.

* * * * *